A. B. CHARLES.
SHAFT MOUNTING.
APPLICATION FILED SEPT. 20, 1919.
1,362,848.
Patented Dec. 21, 1920.
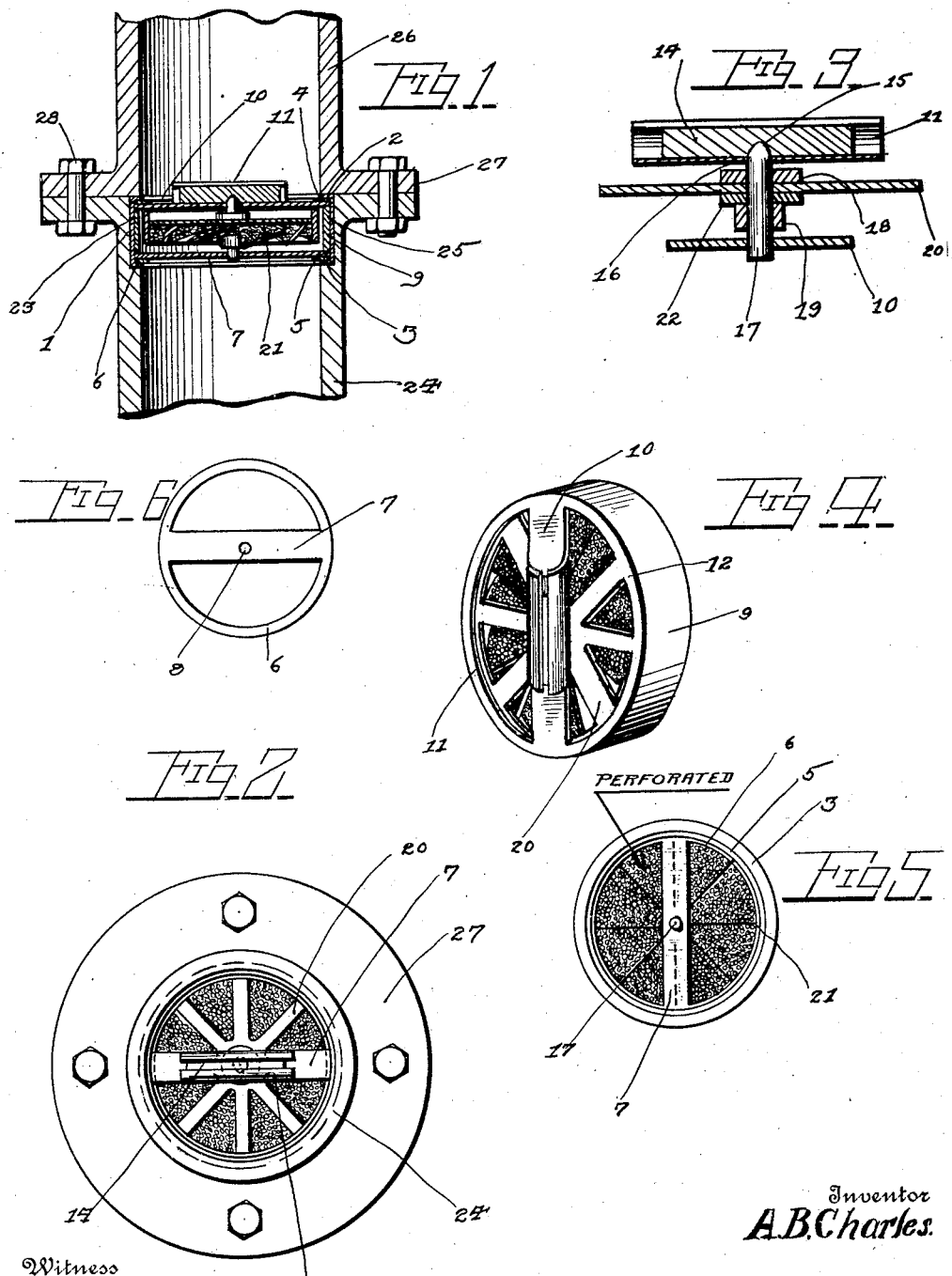

UNITED STATES PATENT OFFICE.

ALBERT B. CHARLES, OF BLUE MOUND, KANSAS.

SHAFT-MOUNTING.

1,362,848.　　　Specification of Letters Patent.　　Patented Dec. 21, 1920.

Application filed September 20, 1919. Serial No. 325,065.

*To all whom it may concern:*

Be it known that I, ALBERT B. CHARLES, a citizen of the United States, residing at Blue Mound, in the county of Linn and State of Kansas, have invented a new and useful Shaft-Mounting, of which the following is a specification.

The device forming the subject matter of this application is adapted to be employed in connection with the fuel supply of an internal combustion engine, for the purpose of securing a thorough vaporization and the invention aims to improve the construction of the rotary member and to improve the mounting thereof.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows the device in transverse section, connected or mounted in the conduit traversed by the mixture; Fig. 2 is an end view of the structure shown in Fig. 1; Fig. 3 is a fragmental transverse section showing one of the bearings and attendant parts; Fig. 4 is a perspective view showing the sleeve and parts carried thereby; Fig. 5 is an end view disclosing the complete structure; and Fig. 6 is a plan showing one of the rings.

In carrying out the invention there is provided a tubular casing 1, provided at one end with an inwardly extended flange 2, and equipped at its other end with an inwardly extended flange 3. A gasket 4 abuts against the flange 2, and a gasket 5 abuts against the flange 3. A ring 6 coöperates with the gasket 5 and includes a cross bar 7 having a bearing opening 8. A sleeve 9 is located in the casing 1 and abuts at one end against the ring 6, the other end of the sleeve coöperating with the gasket 4. At its outer end, the sleeve 9 is supplied with a cross bar 10 having a longitudinal socket 11 made up of ears 12 within which a bearing, in the form of a hardened bar 14 is held, the bearing being supplied with a recess 15 located opposite to an opening 16 fashioned in the cross bar 10.

A rotary member is provided, the same including a shaft 17 journaled at one end in the opening 8 of the cross bar 7 which constitutes a part of the ring 6. The other end of the shaft 17 is journaled in the recess 15 of the bearing 14 as clearly shown in Fig. 3. A hub 18 is carried by the shaft 17, the shaft carrying also, a hub 19. A spider 20 abuts against the hub 18 and includes arms clearly shown in Fig. 2. The numeral 21 includes a plurality of inclined blades disposed at an angle to the axis of the shaft 17, the blades being perforated. The blades 21 are connected to a center piece 22 mounted on the shaft 17 between the hub 19 and the spider 20. The rotary member includes a tubular rim 23 located within the sleeve 9, the outer ends of the blades 21 and the outer ends of the arms of the spider 20 being connected to the rim.

The numeral 24 denotes one member of a fuel conduit, the same being provided near to its end with a recess 25 wherein the casing 21 is received. The numeral 26 denotes the other member of the conduit, said member overhanging the recess 25, so as to hold the casing 21 therein. The members 21 and 26 may have flanges 27 united by securing elements 28.

In practical operation, when the mixture is drawn through the conduit formed by the members 24 and 26, a thorough admixture will be effected by the rotating blades 21. But one series of blades 21 is shown, but there may be any desired number of sets or series of blades, this feature being disclosed in my copending application.

Having thus described the invention, what is claimed is:—

1. A shaft mounting comprising a tubular casing having end flanges; a sleeve in the casing and coöperating with one flange, the sleeve being provided at one end with a cross bar; a ring engaging the opposite end of the sleeve and having a cross bar, the ring coacting with the other flange; and a shaft journaled for rotation in the cross bars.

2. In a shaft mounting, a tubular casing having end flanges; a sleeve in the casing and coöperating with one flange, the sleeve being provided at one end with a cross bar having a longitudinal socket; a bearing mounted in the socket; a ring engaging the opposite end of the sleeve and having a cross bar, the ring coacting with the other flange; and a shaft journaled for rotation in the last specified cross bar, and in the first specified cross bar and the bearing.

In testimony that I claim the foregoing as my own, I have hereto affixed my signature in the presence of two witnesses.

ALBERT B. CHARLES.

Witnesses:
 VIRGIL BURNWORTH,
 C. L. PORTER.